(12) United States Patent  (10) Patent No.: US 9,172,313 B2
Ohashi et al.  (45) Date of Patent: Oct. 27, 2015

(54) OSCILLATORY WAVE DRIVE UNIT AND IMAGE STABILIZATION DEVICE

(75) Inventors: Kaishi Ohashi, Tokyo (JP); Hiroyuki Seki, Oyama (JP); Takayuki Tsukimoto, Fujisawa (JP); Shinji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 13/818,057

(22) PCT Filed: Aug. 10, 2011

(86) PCT No.: PCT/JP2011/004528
§ 371 (c)(1),
(2), (4) Date: Feb. 20, 2013

(87) PCT Pub. No.: WO2012/026079
PCT Pub. Date: Mar. 1, 2012

(65) Prior Publication Data
US 2013/0147978 A1    Jun. 13, 2013

(30) Foreign Application Priority Data
Aug. 23, 2010 (JP) .................. 2010-186068

(51) Int. Cl.
*H02N 2/00*  (2006.01)
*G02B 27/64*  (2006.01)
(Continued)

(52) U.S. Cl.
CPC .............. *H02N 2/001* (2013.01); *G02B 27/646* (2013.01); *G03B 5/00* (2013.01); *H02N 2/0015* (2013.01); *H02N 2/026* (2013.01); *H02N 2/028* (2013.01); *H04N 5/2254* (2013.01);
(Continued)

(58) Field of Classification Search
CPC ...................................................... H04N 2/001
USPC ...................................................... 348/208.7
See application file for complete search history.

(56) References Cited

U.S. PATENT DOCUMENTS 5,237,238 A    8/1993   Berghaus
6,252,333 B1   6/2001   Iino
(Continued)

FOREIGN PATENT DOCUMENTS

CN    101160711 A    4/2008
CN    101373936 A    2/2009
(Continued)

OTHER PUBLICATIONS

JP-2010-161857-A Translation—Machine Translation of corresponding Japanese Patent Application Publication.*

*Primary Examiner* — Jason Flohre
(74) *Attorney, Agent, or Firm* — Canon USA Inc. IP Division

(57) ABSTRACT

An oscillatory wave drive unit includes at least one vibrator having an electromechanical energy converting element, and at least one supporting member configured to support the at least one vibrator. The oscillatory wave drive unit excites oscillation in the at least one vibrator and moves a moving body in contact with the at least one vibrator by frictional force. The oscillatory wave drive unit includes at least one moving mechanism configured to support the at least one vibrator movably in a plane parallel to the plane where the at least one vibrator and the moving body are in contact with each other, in a second direction intersecting with a first direction in which the at least one vibrator drives the moving body.

19 Claims, 11 Drawing Sheets

(51) Int. Cl.
*G03B 5/00* (2006.01)
*H02N 2/02* (2006.01)
*H04N 5/225* (2006.01)
*H04N 5/232* (2006.01)

(52) U.S. Cl.
CPC ........ *H04N 5/2328* (2013.01); *H04N 5/23258* (2013.01); *G03B 2205/0015* (2013.01); *G03B 2205/0061* (2013.01)

(56) References Cited

U.S. PATENT DOCUMENTS

| | | | |
|---|---|---|---|
| 6,397,008 B2 * | 5/2002 | Kuwana et al. | 396/55 |
| 6,539,174 B1 | 3/2003 | Tanii | |
| 7,973,822 B2 | 7/2011 | Olympus | |
| 2009/0072665 A1 | 3/2009 | Adachi | |
| 2010/0060107 A1 * | 3/2010 | Seki et al. | 310/323.16 |
| 2010/0171392 A1 * | 7/2010 | Mukae | 310/328 |
| 2011/0013029 A1 * | 1/2011 | Akutsu et al. | 348/208.11 |
| 2011/0102613 A1 * | 5/2011 | Noguchi | 348/208.11 |

FOREIGN PATENT DOCUMENTS

| | | | |
|---|---|---|---|
| EP | 747977 A1 | | 12/1996 |
| EP | 938144 A2 | | 8/1999 |
| EP | 2009711 A2 | | 12/2008 |
| GB | 2246236 A | | 1/1992 |
| JP | 08-340682 A | | 12/1996 |
| JP | H11-271480 A | | 10/1999 |
| JP | 2001-116867 A | | 4/2001 |
| JP | 3911936 B2 | | 5/2007 |
| JP | 2008-220031 A | | 9/2008 |
| JP | 2009-031353 A | | 2/2009 |
| JP | 2010-161857 A | | 7/2010 |
| JP | 2010161857 A | * | 7/2010 |
| WO | 2008/102553 A1 | | 8/2008 |

* cited by examiner

OSCILLATORY WAVE DRIVE UNIT AND IMAGE STABILIZATION DEVICE

TECHNICAL FIELD

The present invention relates to an oscillatory wave drive unit and an image stabilization device including the same.

BACKGROUND ART

Many oscillatory wave drive units have been proposed that excite oscillation in a vibrator and move a moving body pressed against the vibrator. These are positioned as important functional components in optical instruments that must operate particularly precisely. PTL 1 and PTL 2 disclose combining a plurality of straight-type oscillatory wave drive units that can each move a moving body linearly, to move a moving body in two-dimensional directions for use as an image stabilization device.

However, combining a plurality of oscillatory wave drive units has the following serious problem to be solved. When a moving body is moved in some directions, the moving direction of the moving body and the driving direction of some of the plurality of oscillatory wave drive units intersect at right angles or at close to right angles. In this case, the oscillatory wave drive units the driving direction of which intersects with the moving direction at right angles or at close to right angles cannot contribute to driving. The frictional force due to the contact between the moving body and the oscillatory wave drive units interferes with the movement of the moving body and causes energy loss and therefore power loss. When the combination of oscillatory wave drive units is used as a drive unit for an image stabilization device, the properties of the image stabilization device are decreased.

To solve such a problem, PTL 1 and PTL 2 disclose exciting oscillation in oscillatory wave drive units in the direction in which the oscillatory wave drive units are pressed against a moving body, to reduce frictional force and to reduce power loss.

CITATION LIST

Patent Literature

PTL 1: Japanese Patent Laid-Open No. 2009-031353
PTL 2: U.S. Pat. No. 6,539,174

SUMMARY OF INVENTION

Technical Problem

The above-described method for reducing power loss in oscillatory wave drive units or an image stabilization device can reduce power loss but requires electric energy in order to excite oscillation in oscillatory wave drive units that do not contribute to the movement of the moving body, and therefore power consumption increases. In addition, the amplitude of oscillation in the direction in which the oscillatory wave drive units are pressed against the moving body needs to be a certain value or more in order to effectively reduce power loss. For this reason, it is necessary to generate oscillation having an amplitude of a certain value or more, and power consumption increases.

The present invention provides an oscillatory wave drive unit and an image stabilization device that can reduce power loss without increasing power consumption.

In an aspect of the present invention, an oscillatory wave drive unit includes at least one vibrator having an electromechanical energy converting element, and at least one supporting member configured to support the at least one vibrator. The oscillatory wave drive unit excites oscillation in the at least one vibrator and moves a moving body in contact with the at least one vibrator by frictional force. The oscillatory wave drive unit includes at least one moving mechanism configured to support the at least one vibrator movably in a plane parallel to the plane where the at least one vibrator and the moving body are in contact with each other, in a second direction intersecting with a first direction in which the at least one vibrator drives the moving body.

Advantageous Effects of Invention

According to the present invention, an oscillatory wave drive unit has a mechanism that when a force acts on a vibrator in a direction different from the driving direction, moves the vibrator in the direction in which the force acts. Therefore, power loss can be reduced without increasing power consumption of an oscillatory wave drive unit and an image stabilization device.

DESCRIPTION OF EMBODIMENTS

Figure 1:
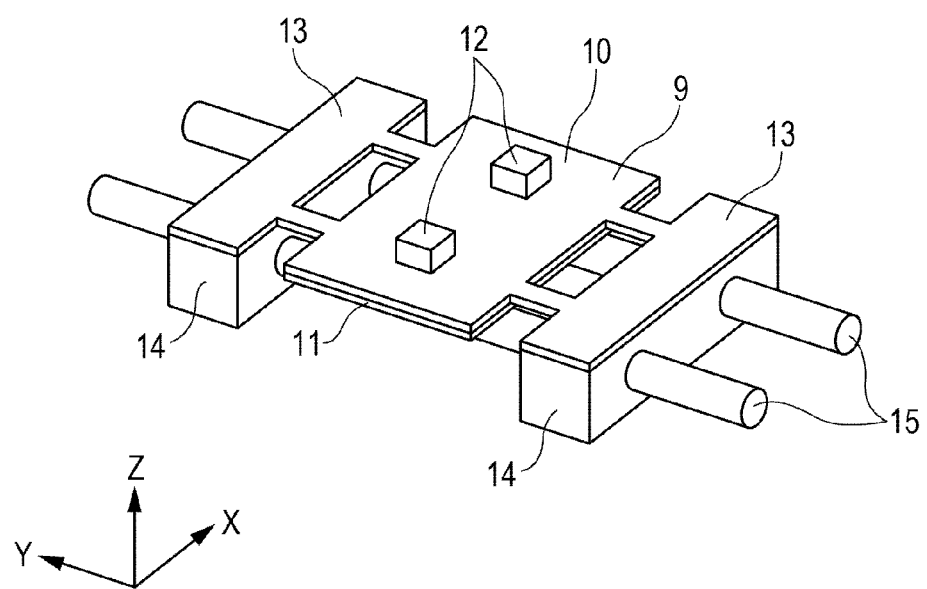
FIG. 1 is a perspective view of an oscillatory wave drive unit according to a first embodiment.

Embodiments of the present invention will now be described. In an aspect of the present invention, an oscillatory wave drive unit includes at least one vibrator having an electromechanical energy converting element, and at least one supporting member configured to support the at least one vibrator. The oscillatory wave drive unit excites oscillation in the at least one vibrator and moves a moving body in contact with the at least one vibrator by frictional force. The oscillatory wave drive unit includes at least one moving mechanism configured to support the at least one vibrator movably in a plane parallel to the plane where the at least one vibrator and the moving body are in contact with each other, in a second direction intersecting with a first direction in which the at least one vibrator drives the moving body.

In the present invention, "the plane where the at least one vibrator and the moving body are in contact with each other" means an imaginary plane including a plurality of contact points where the at least one vibrator and the moving body are in contact with each other. "A plane parallel to the plane where the at least one vibrator and the moving body are in contact with each other" means an imaginary plane parallel to "the plane where the at least one vibrator and the moving body are in contact with each other," and there are myriad such planes. These planes define a first direction and a second direction that are directions for defining the moving direction of the moving mechanism of the present invention. In the present invention, the first direction is a direction in which the vibrator moves the moving body, and is also referred to as driving direction. In the present invention, the second direction is a direction in which the vibrator can move owing to the moving mechanism of the present invention, and is also referred to as "dodging direction." When a force acts on the vibrator in a direction intersecting with the original moving direction of the moving body, the vibrator moves without resisting the force (dodges) in the second direction. The moving mechanism of the present invention is characterized in that it can support the vibrator movably in the second direction defined by the above configuration.

In the present invention, in order to support the vibrator movably only in the second direction (substantially immovably in the first direction) (as the moving mechanism of the present invention), a guide member can be provided that can move only in the second direction. Alternatively, the vibrator can be supported by an elastic member (typically a spring member) that can be easily displaced only in a certain direction.

In the present invention, a state where "a second direction intersecting with the first direction" exists means a state where a component in a direction different from the moving direction (first direction) exists (a force moving in a direction different from the first direction is generated). Such a state where a force moving in a direction different from the moving direction is acting causes power loss as described above. When the angle at which the first direction and the second direction intersect is 90 degrees angle, power loss is most likely to be caused. Even if the angle at which the first direction and the second direction intersect is very small, power loss according to the angle can be caused.

The vibrator of the present invention is composed of an oscillating plate (also referred to as oscillating body) and an electromechanical energy converting element (typically a piezoelectric ceramics). By applying a predetermined electric field to the electromechanical energy converting element, a desired oscillation can be excited.

In the present invention, a straight-type oscillatory wave drive unit means an oscillatory wave drive unit that can drive linearly, and is also referred to as linear-type oscillatory wave drive unit. A single straight-type oscillatory wave drive unit moves a moving body (also referred to as driven body) linearly. By combining a plurality of straight-type oscillatory wave drive units, a moving body can be moved (or relatively moved) in a desired direction.

Embodiments of the present invention will be described. The present invention is not limited to the embodiments. The term "direction" in each embodiment means a direction in "a plane parallel to the plane where the at least one vibrator and the moving body are in contact with each other."

First Embodiment

Figure 3:
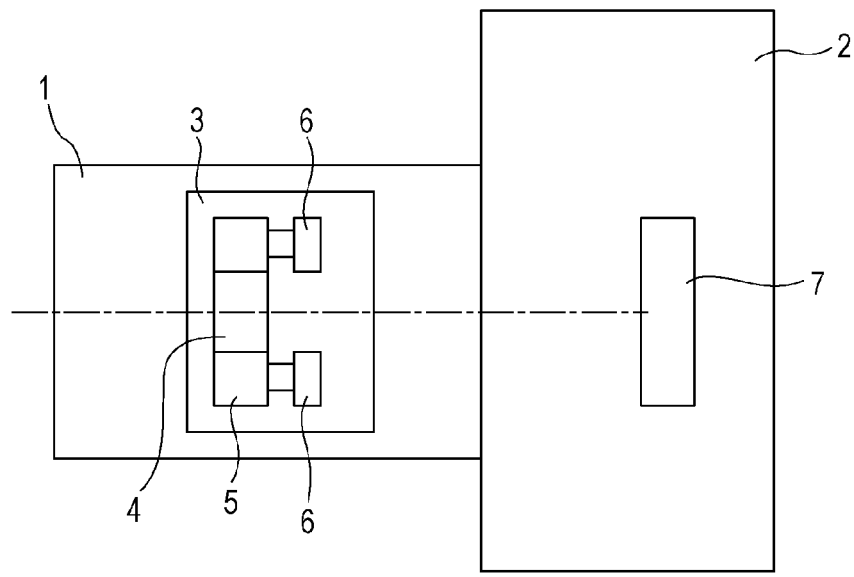
FIG. 3 is a sectional view of a camera as an imaging apparatus according to the first embodiment.

FIG. 3 is a sectional view of a camera as an imaging apparatus according to a first embodiment of the present invention. The camera of FIG. 3 can take moving and still pictures. Reference numeral 1 denotes a lens barrel, and reference numeral 2 denotes a camera body. Reference numeral 3 denotes an image stabilization device built in the lens barrel 1. The unit 3 includes an optical lens 4, a moving body 5 holding the optical lens 4, oscillatory wave drive units 6 that move the moving body 5.

Although not shown in FIG. 3, the lens barrel 1 is provided with an optical system other than the optical lens 4, an acceleration sensor that detects a shake of the lens barrel 1, an encoder that detects the two-dimensional movement of the moving body. The lens barrel 1 is further provided with a power source that supplies electric energy to the oscillatory wave drive units 6, and a control unit that processes a signal output from the acceleration sensor and a signal output from the encoder and operates the power source.

The camera body 2 has an image sensor 7 therein. Light from an object passes through an optical system including the optical lens 4 in the lens barrel 1 and is incident on the image sensor 7 in the camera body 2. By moving the optical lens 4 with the oscillatory wave drive units 6 on the basis of the signal from the acceleration sensor, the image can be stabilized.

Figure 2:
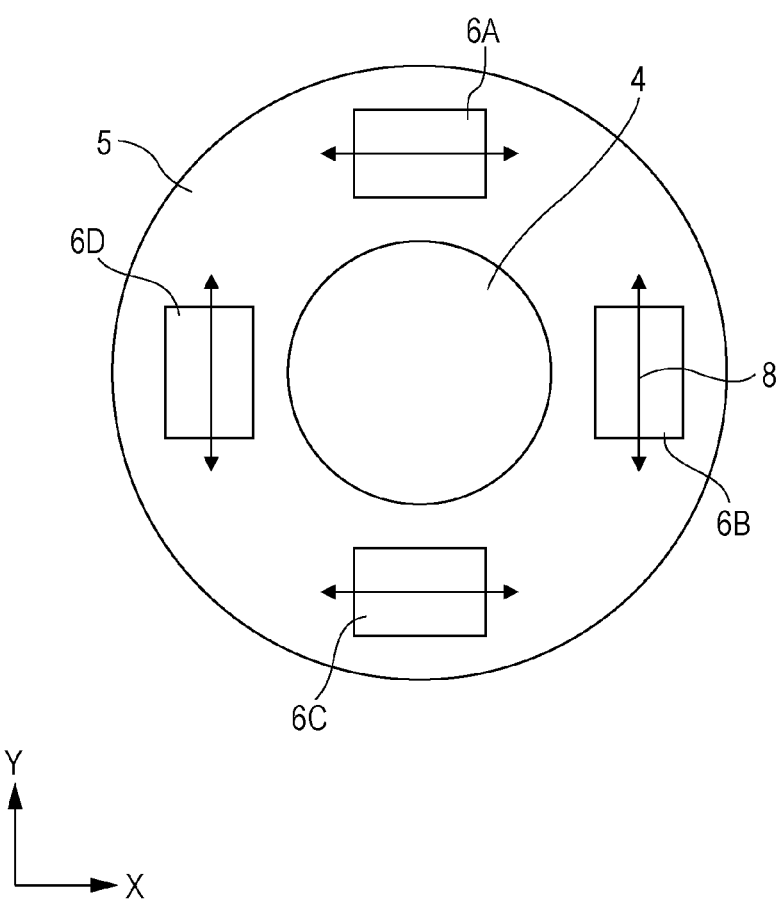
FIG. 2 illustrates the arrangement of a moving body and oscillatory wave drive units according to the first embodiment.

FIG. 2 illustrates the arrangement of the moving body 5 and the oscillatory wave drive units 6 as viewed from the image sensor 7 side. The moving body 5 is made of heat-treated stainless steel having a high resistance to abrasion and has an annular shape. The moving body 5 holds the optical lens 4 for image stabilization in the central part thereof. The oscillatory wave drive units 6 are disposed, avoiding the optical lens 4 in the radial direction, so as not to interfere with the optical path. Four oscillatory wave drive units 6 (6A, 6B, 6C, and 6D) are disposed at regular intervals in the circumferential direction.

The oscillatory wave drive units 6 are capable of straight forward and backward driving. The driving direction of each oscillatory wave drive unit is shown by arrow 8. The driving direction of the oscillatory wave drive units 6A and 6C is the X direction in the figure. The driving direction of the oscillatory wave drive units 6B and 6D is the Y direction in the figure. The arrangement of the oscillatory wave drive units 6 is such that the driving directions thereof intersect at right angles. By combining these oscillatory wave drive units 6, the moving body 5 can be moved two-dimensionally in the XY plane. In this embodiment, the moving body 5 can be moved two-dimensionally by oscillatory wave drive units 6 whose driving directions intersect at right angles. However, the moving body 5 can be moved two-dimensionally as long as oscillatory wave drive units 6 are arranged such that the driving directions thereof intersect.

FIG. 1 is a perspective view of an oscillatory wave drive unit 6 of the present invention. The coordinate system in the figure is a right-handed rectangular coordinate system. Reference numeral 9 denotes a rectangular plate-like vibrator. The vibrator 9 is composed of an oscillating plate 10 having two protrusions 12, and a piezoelectric ceramics 11 that is an electromechanical energy converting element fixed to the oscillating plate 10. The oscillating plate 10 includes beam portions and vibrator securing portions 13. The two protrusions 12 are arranged in the longitudinal direction of the vibrator 9.

Reference numeral 14 denotes sleeves fixed to the vibrator securing portions 13, and reference numeral 15 denotes bars whose ends are secured to the lens barrel 1. The sleeves 14 have holes, through which the bars 15 passes. The combination of the sleeves 14 and the bars 15 forms a guide member. A guide member in the present invention means a member that permits movement in a particular direction and prevents movement in the other directions. The vibrator 9 is movable in the longitudinal direction of the bars 15. Grease is applied to the contact surfaces of the sleeves 14 and the bars 15, so that sliding resistance is extremely small. The upper surfaces of the protrusions 12 are in contact with the moving body 5. The protrusions 12 are pressed by a coil spring (not shown) toward the moving body 5. Thus, the protrusions 12 are pressed against the moving body 5.

Figure 4A:
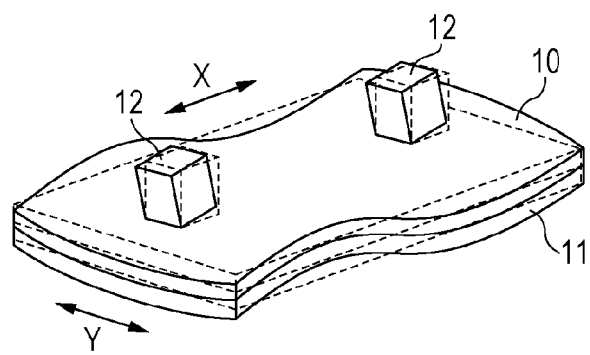
FIG. 4A illustrates an oscillation mode of a vibrator.
Figure 4B:
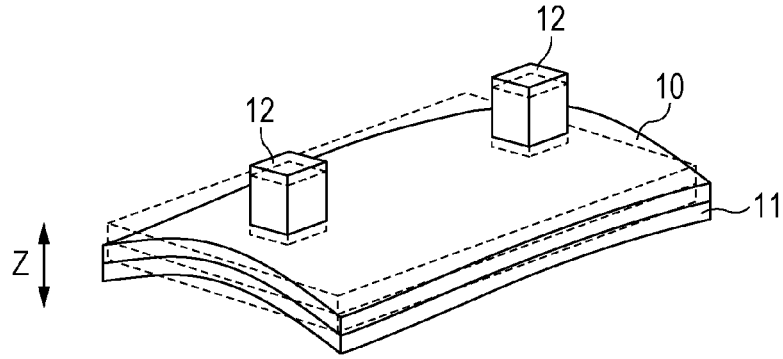
FIG. 4B illustrates another oscillation mode of the vibrator.

An alternating voltage is applied to the piezoelectric ceramics 11 from the power source to excite oscillation in two oscillation modes in the vibrator 9. FIGS. 4A and 4B show two oscillation modes. The oscillation mode of FIG. 4A is called A-mode. The oscillation mode of FIG. 4B is called B-mode. The oscillation mode shown in FIG. 4A is an oscillation mode (A-mode) in which the upper surfaces of the protrusions 12 oscillate in the longitudinal direction of the vibrator 9 (also referred to as conveying direction: X direction in the figure). The oscillation mode shown in FIG. 4B is an oscillation mode (B-mode) in which the upper surfaces of the protrusions 12 oscillate in the direction of contact with the moving body 5 (also referred to as lifting direction). The alternating voltage is set so that oscillations in these two oscillation modes are excited at a time phase difference of substantially 90 degrees angle. The term "substantially 90 degrees angle" means that when the angle is not strictly 90 degrees angle, it is tolerated as long as necessary oscillations are combined. The term "substantially" in the present invention has the same meaning. Thus, the upper surfaces of the protrusions 12 move along elliptic loci and move the moving body 5 in contact therewith in one direction, the X direction in FIG. 4A. When the phase difference between oscillations in the two oscillation modes is −90 degrees angle, the moving body 5 can be moved in the opposite direction.

These moving directions are the driving direction (Y direction: first direction) of the oscillatory wave drive units 6 shown by arrows 8 in FIG. 2. In this embodiment, the oscillatory wave drive units 6 each have a guide member composed of sleeves 14 and bars 15, in a direction (second direction) perpendicular to the driving direction (first direction). Thus, when the moving body 5 moves in the X direction (second direction), the oscillatory wave drive units 6B and 6D move (are supported movably) in the X direction together with the movement of the moving body 5. The movement in the X direction is not prevented, and the resistance is substantially negligible. Thus, the force acting from the oscillatory wave drive units 6B and 6D on the moving body 5 can be eliminated almost completely, the movement of the moving body 5 is not interfered with, and almost no power loss is caused.

In the present invention, it is not necessary to excite oscillation in the mode (A-mode) of FIG. 4A in the oscillatory wave drive units 6B and 6D, and the voltage applied to the electromechanical energy converting element 11 can be reduced. The power used for this can be saved. When the voltage applied to the electromechanical energy converting element 11 is zero, the power consumption reduction effect is most pronounced.

Referring to FIG. 2, in this embodiment, when the moving body 5 is driven in the Y direction (first direction for the oscillatory wave drive units 6B and 6D), the oscillatory wave drive units 6A and 6C are moved in the Y direction (second direction for the oscillatory wave drive units 6A and 6C) Similarly, when the moving body 5 is driven in the X direction (first direction for the oscillatory wave drive units 6A and 6C), the oscillatory wave drive units 6B and 6D are moved in the X direction (second direction for the oscillatory wave drive units 6B and 6D). When the X direction and the Y direction intersect at an angle other than 90 degrees angle, in any of the oscillatory wave drive units 6 (6A, 6B, 6C, and 6D), the driving direction intersects the moving direction of the moving body 5, and therefore a frictional force component in a direction perpendicular to the driving direction is generated. Even in such a case, according to the present invention, power loss due to the frictional force between the moving body 5 and the oscillatory wave drive units 6 can be reduced.

In this embodiment, the moving body is moved two-dimensionally using only the oscillatory wave drive units 6. However, some of them may be replaced with an electromagnetic motor that does not use contact. For example, when an electromagnetic motor and an oscillatory wave drive unit 6 are disposed such that the driving directions thereof differ from each other, the moving body 5 can be moved in the two-dimensional directions.

In this embodiment, an image stabilization device 3 is built in a lens barrel 1. However, the image stabilization device 3 may be built in the camera body 2. When the image sensor in the camera body is moved, the same advantageous effect as in this embodiment can be obtained. When the shape and the oscillation mode of the vibrator 9 are different from those in this embodiment, the advantageous effect of the present invention can be obtained.

Problems in the case where the related art is used in this embodiment will be described with reference to FIG. 2. For example, in the case where an image is moved in the X direction (second direction) and the moving body 5 is moved in the X direction so as to offset it, the oscillatory wave drive units 6B and 6D do not contribute to the driving because the driving direction thereof is the Y direction. In addition, because the oscillatory wave drive units 6B and 6D are pressed against the moving body 5, frictional force is generated therebetween and prevents the moving body 5 from moving in the X direction. In order to reduce the degree of this prevention, an oscillation in the oscillation mode shown in FIG. 4B is excited in which the upper surfaces of the protrusions 12 oscillate in the direction of contact with the moving body 5. However, in order to sufficiently reduce the frictional force, a large amplitude oscillation is required. In order to generate a large amplitude oscillation, a large amount of power is required.

Second Embodiment

Figure 5A:
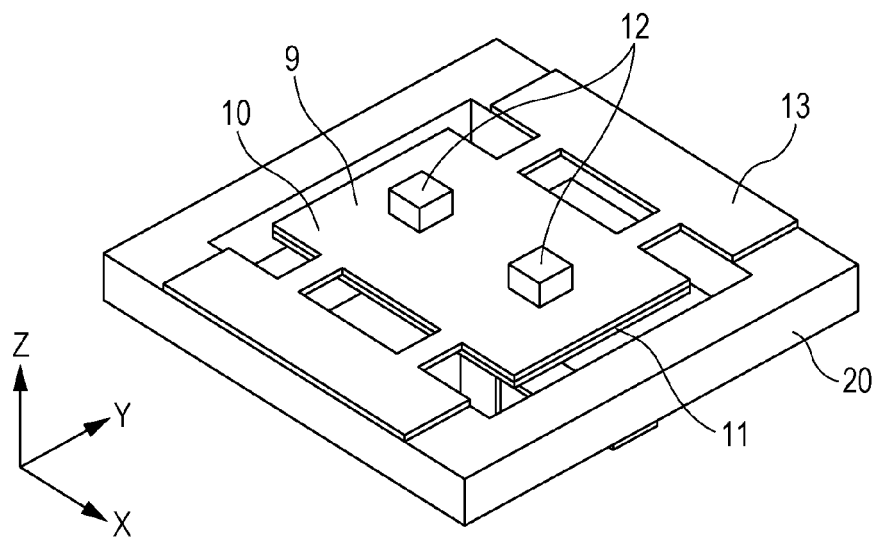
FIG. 5A is a perspective view of an oscillatory wave drive unit according to a second embodiment.
Figure 5B:
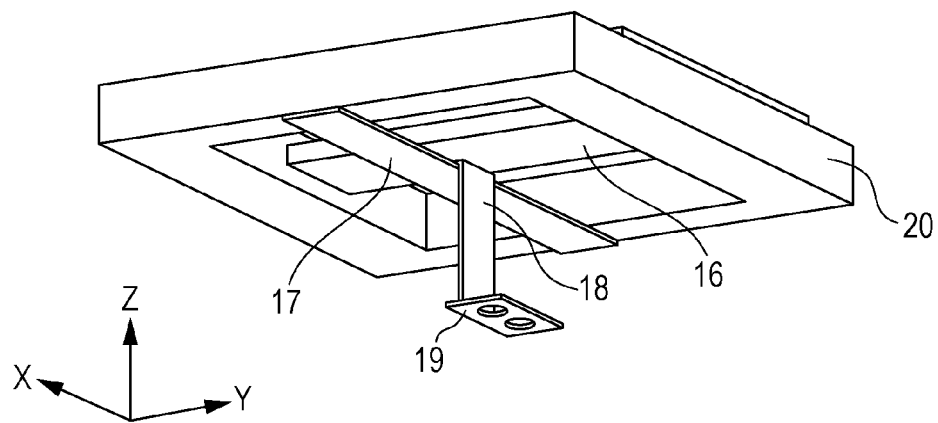
FIG. 5B is another perspective view of the oscillatory wave drive unit according to the second embodiment.

FIG. 5A is a perspective view of an oscillatory wave drive unit according to another embodiment of the present invention as viewed from the protrusions 12 side. FIG. 5B is a perspective view of the oscillatory wave drive unit as viewed from the side opposite to the protrusions 12. The coordinate system in the figures is a right-handed rectangular coordinate system. A description will be given with reference to the two figures.

This embodiment differs from the first embodiment in the configuration of the vibrator and the securing portion, and the configuration for holding the vibrator. A holder 20 is coupled to securing portions 13 of a vibrator 9 and has a square frame-like shape. A spring 17 that is an elastic member is attached to the holder 20. The holder 20 holds a magnet 16 in a space between the vibrator 9 and the spring 17.

The spring 17 is made by pressing a sheet of stainless steel spring material. However, the configuration of springs usable in the present invention is not limited to this. The spring 17 includes a part secured to the holder 20 and extending in the X direction in the figure, a spring deforming in the Y direction (hereinafter referred to as "Y-deforming spring") 18 extending from the part in the Z direction in the figure, and a securing portion 19 at the end of the Y-deforming spring 18. The securing portion 19 is secured to a lens barrel 1 (not shown). The thickness direction of the Y-deforming spring 18 is the Y direction in the figure. The Y-deforming spring 18 has low spring stiffness in the Y direction (second direction) and high spring stiffness in the X direction (first direction).

When a moving body 5 (not shown) made of a magnetic material is brought into contact with the protrusions 12, the vibrator 9 is pressed against the moving body 5 by the magnet 16. As in the first embodiment, by applying a predetermined alternating voltage to a piezoelectric ceramics 11, the moving body 5 can be driven in the X direction (first direction). When the moving body 5 is moved by another actuator in the Y direction (second direction), the Y-deforming spring 18 bends in the Y direction because it has low spring stiffness in the Y direction, and the vibrator 9 moves in the Y direction. At this time, the force in the Y direction given from the vibrator 9 to the moving body 5 is the product of the amount of movement in the Y direction of the vibrator 9 and the spring stiffness in the Y direction of the Y-deforming spring 18. By reducing the thickness or width of the Y-deforming spring 18 or using a spring having low spring stiffness, the spring stiffness can be easily reduced, and the force preventing the moving body 5 from moving in the Y direction can be reduced. In the X direction, or the driving direction of the oscillatory wave drive unit, the spring stiffness of the Y-deforming spring 18 is high. Therefore, the moving body 5 can be driven in the X direction with small loss of force. In the first embodiment, a guide member is used, whereas in this embodiment, a leaf spring is used, and the advantageous effect of the present invention can be obtained with a simpler structure.

Third Embodiment

Figure 6:
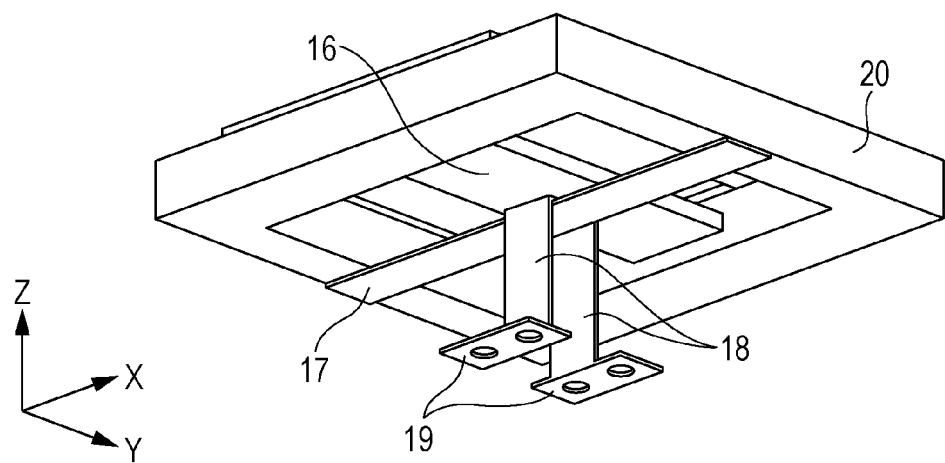
FIG. 6 is a perspective view of an oscillatory wave drive unit according to a third embodiment.

FIG. 6 is a perspective view of an oscillatory wave drive unit according to another embodiment of the present invention as viewed from the side opposite to the protrusions 12. The coordinate system in the figure is a right-handed rectangular coordinate system.

This embodiment differs from the second embodiment in that a spring 17 includes two Y-deforming springs 18 in the Y direction (second direction) in the figure, and two securing portions 19 at the ends the Y-deforming springs 18. The two securing portions 19 are secured to a lens barrel 1 (not shown). This configuration is, elastically, a parallel crank mechanism in the Y direction (second direction). When the vibrator 9 is subjected to a force in the Y direction from the moving body 5, the vibrator 9 is not prone to rotary motion in the XZ plane and moves mainly in the Y direction. In this embodiment, as in the second embodiment, the thickness direction of the Y-deforming springs 18 is the Y direction (second direction) in the figure. The Y-deforming springs 18 have low spring stiffness in the Y direction. Thus, the force preventing the moving body 5 from moving in the Y direction can be reduced. In the X direction (first direction), the spring stiffness is high. Therefore, the moving body 5 can be driven in the X direction with small loss of force.

When the moving body 5 is moved by another actuator and the vibrator 9 moves in the Y direction, due to the elastic parallel crank mechanism, the vibrator 9 is not prone to rotary motion in the XZ plane. Thus, the amount of inclination of the protrusions 12 of the vibrator 9 to the moving body 5 is reduced, and the contact between the protrusions 12 and the moving body 5 can be stabilized.

Fourth Embodiment

Figure 7A:
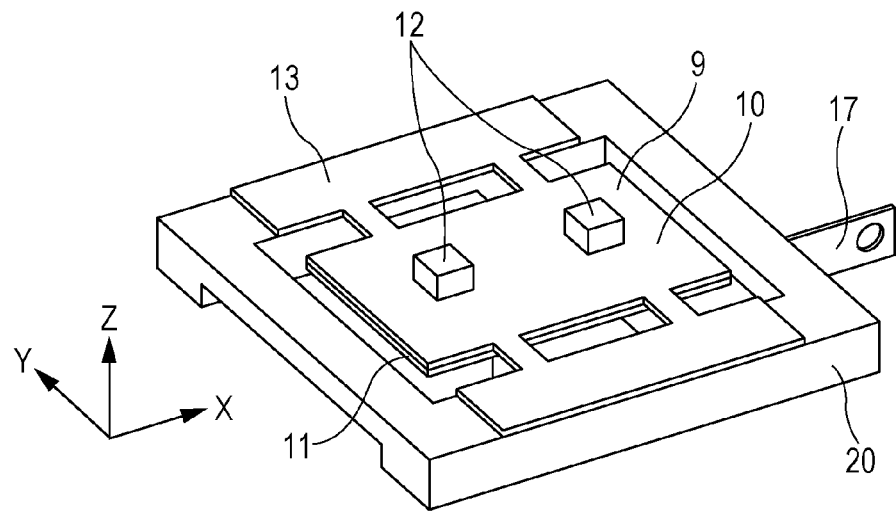
FIG. 7A is a perspective view of an oscillatory wave drive unit according to a fourth embodiment.
Figure 7B:
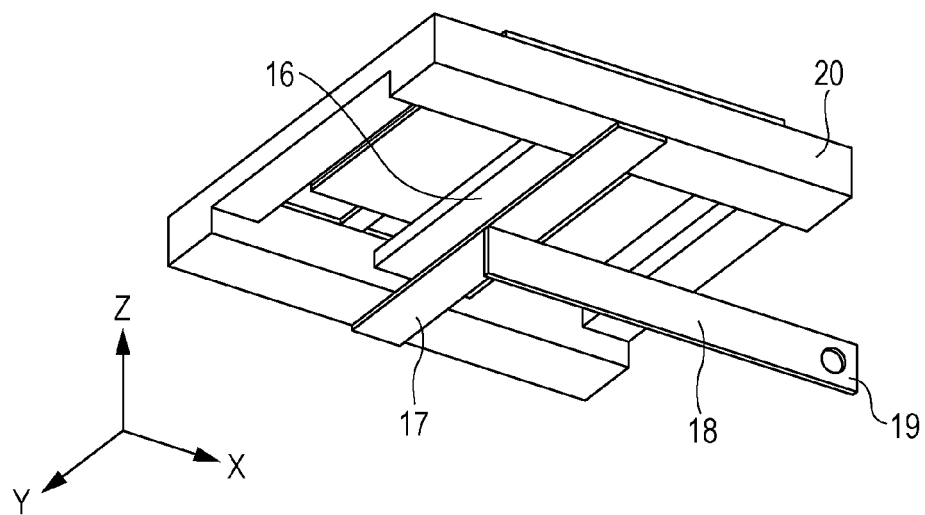
FIG. 7B is another perspective view of the oscillatory wave drive unit according to the fourth embodiment.

FIG. 7A is a perspective view of an oscillatory wave drive unit according to another embodiment of the present invention as viewed from the protrusions 12 side. FIG. 7B is a perspective view of the oscillatory wave drive unit as viewed from the side opposite to the protrusions 12. The coordinate system in the figures is a right-handed rectangular coordinate system. A description will be given with reference to the two figures.

This embodiment differs from the second embodiment in that the longitudinal direction of the Y-deforming spring 18 and the retaining portion 19 of the spring 17 is the driving direction of the oscillatory wave drive unit, or the X direction (first direction). The thickness direction of the Y-deforming spring 18 is, as in the second embodiment, the Y direction (second direction) in the figure perpendicular to the driving direction of the oscillatory wave drive unit.

In this embodiment, as in the second embodiment, the thickness direction of the Y-deforming spring 18 is the Y direction in the figure, and the spring stiffness is low in the Y direction. Thus, the force preventing the moving body 5 from moving in the Y direction can be reduced. In the X direction, the spring stiffness is high. Therefore, the moving body 5 can be driven in the X direction with small loss of force. In this embodiment, the longitudinal direction of the spring 17 is the X direction, and therefore the height of the oscillatory wave drive unit can be reduced.

Fifth Embodiment

Figure 8A:
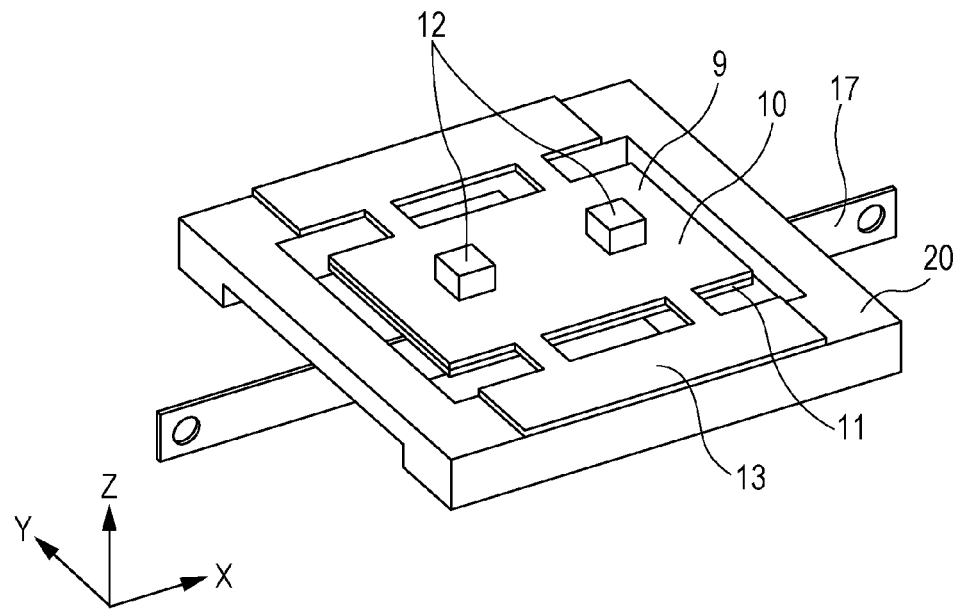
FIG. 8A is a perspective view of an oscillatory wave drive unit according to a fifth embodiment.
Figure 8B:
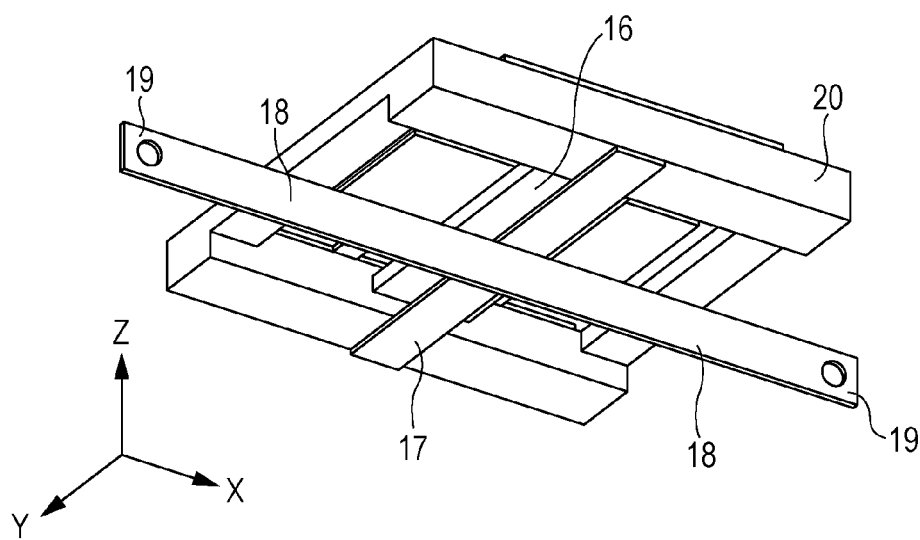
FIG. 8B is another perspective view of the oscillatory wave drive unit according to the fifth embodiment.

FIG. 8A is a perspective view of an oscillatory wave drive unit according to another embodiment of the present invention as viewed from the protrusions 12 side. FIG. 8B is a perspective view of the oscillatory wave drive unit as viewed from the side opposite to the protrusions 12. The coordinate system in the figures is a right-handed rectangular coordinate system. A description will be given with reference to the two figures. This embodiment differs from the fourth embodiment in that a spring 17 includes two Y-deforming springs 18 and two securing portions 19 disposed in the driving direction of the oscillatory wave drive unit, or the X direction. The thickness direction of the Y-deforming springs 18 is, as in the fourth embodiment, the Y direction (second direction) in the figure perpendicular to the driving direction (first direction) of the oscillatory wave drive unit.

In this embodiment, as in the fourth embodiment, the thickness direction of the Y-deforming springs 18 is the Y direction in the figure, and the spring stiffness is low in the Y direction (second direction). Thus, the force preventing the moving body 5 from moving in the Y direction can be reduced. In the X direction (first direction), the spring stiffness is high. Therefore, the moving body 5 can be driven in the X direction with small loss of force.

When the moving body 5 is moved by another actuator and the vibrator 9 moves in the Y direction, the stiffness to the rotation in the XY plane is high, and rotary motion in this plane is not prone to occur. Thus, the amount of rotation of the driving direction of the oscillatory wave drive unit in the XY plane can be reduced.

Sixth Embodiment

Figure 9A:
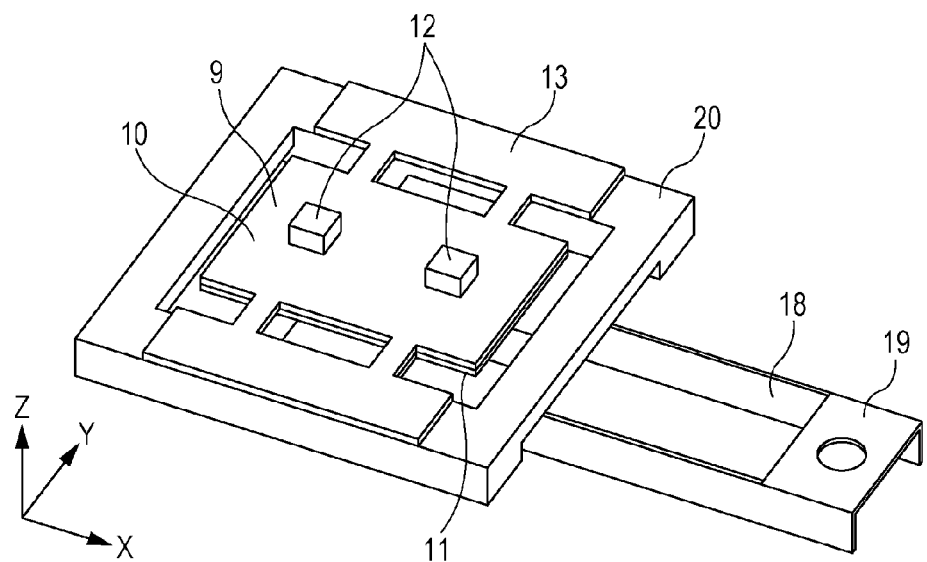
FIG. 9A is a perspective view of an oscillatory wave drive unit according to a sixth embodiment.
Figure 9B:
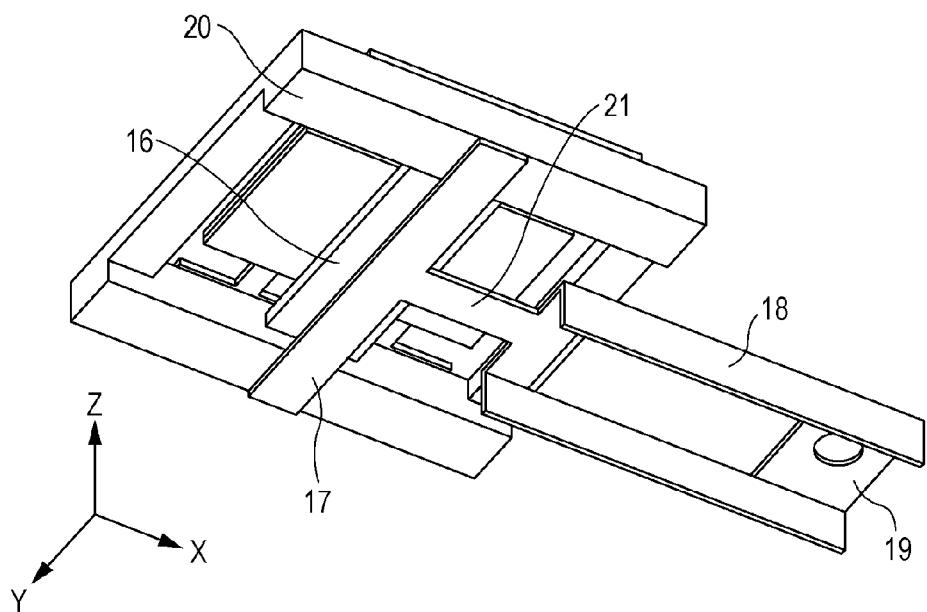
FIG. 9B is another perspective view of the oscillatory wave drive unit according to the sixth embodiment.

FIG. 9A is a perspective view of an oscillatory wave drive unit according to another embodiment of the present invention as viewed from the protrusions 12 side. FIG. 9B is a perspective view of the oscillatory wave drive unit as viewed from the side opposite to the protrusions 12. The coordinate system in the figures is a right-handed rectangular coordinate system. A description will be given with reference to the two figures. This embodiment differs from the fifth embodiment in that a spring 17 includes two Y-deforming springs 18 disposed in the Y direction in the figure perpendicular to the driving direction of the oscillatory wave drive unit. When two Y-deforming springs 18 are disposed in the driving direction (X direction) as in the fifth embodiment, and when the vibrator 9 moves significantly in the Y direction (second direction), the Y-deforming springs 18 are pulled in the longitudinal direction. This prevents the vibrator 9 from moving in the Y direction. When movement of a certain amount or more is required, the movement of the moving body 5 in the Y direction may be limited. In contrast, in this embodiment, two Y-deforming springs 18 are disposed in the Y direction. Even if the vibrator 9 moves significantly in the Y direction (second direction), the Y-deforming springs 18 keep the state of bending deformation, and the Y-deforming springs 18 can be prevented from being pulled in the longitudinal direction.

The spring 17 of this embodiment includes a buffer portion 21. The thickness direction of the buffer portion 21 is the Z direction, and the longitudinal direction of the buffer portion 21 is the X direction. The buffer portion 21 has such a configuration that the rotary motion in the YZ plane and the XZ plane and the translation motion in the Z direction of the vibrator 9 tend to occur. Even if there are errors in the position of the oscillatory wave drive unit secured to a moving body 5 (not shown) in these directions, the upper surfaces of the protrusions 12 can easily follow the surface of the moving body 5.

The thickness direction of the Y-deforming springs 18 is, as in the fifth embodiment, the Y direction in the figure perpendicular to the driving direction (first direction) of the oscillatory wave drive unit. In this embodiment, as in the fifth embodiment, the thickness direction of the Y-deforming springs 18 is the Y direction in the figure, and the spring stiffness is low in the Y direction. Thus, the force preventing the moving body 5 from moving in the Y direction can be reduced. In the X direction (first direction), the spring stiffness is high. Therefore, the moving body 5 can be driven in the X direction with small loss of force.

Seventh Embodiment

Figure 12:
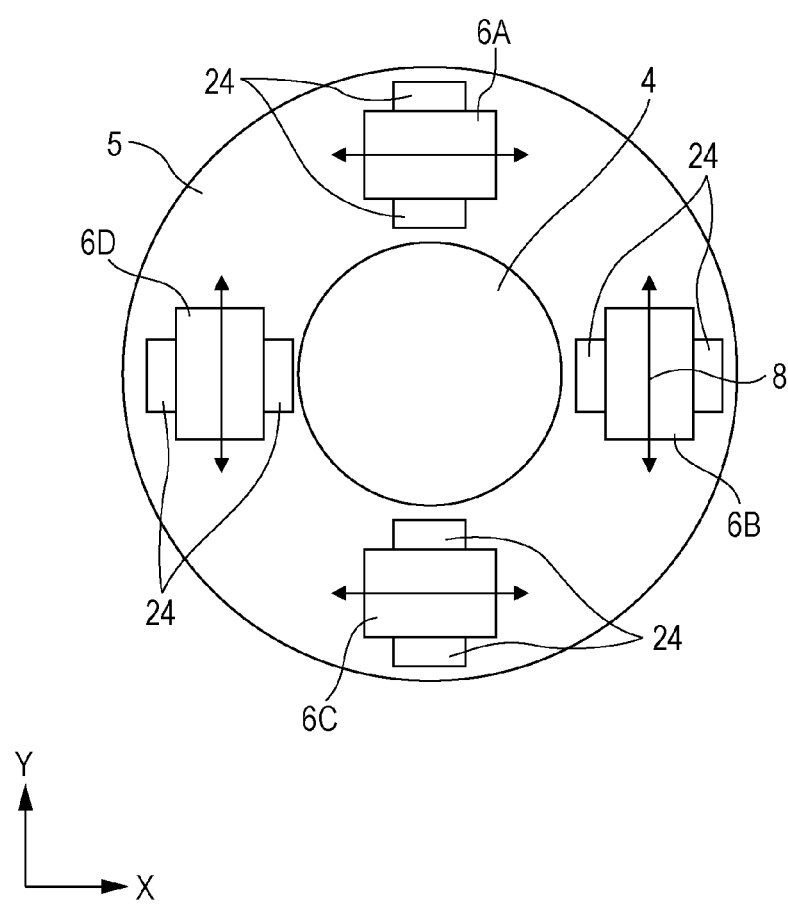
FIG. 12 illustrates the arrangement of a moving body and oscillatory wave drive units according to a seventh embodiment.

This embodiment differs from the first embodiment in that this embodiment has limiting members 24. A description will be given with reference to FIG. 12. FIG. 12 shows the arrangement of a moving body 5 and oscillatory wave drive units 6 as viewed from the image sensor 7 side.

Limiting members 24 have a shape of a rectangular solid and are fixed to the moving body 5. The sleeves 14 to which the vibrator 9 of each of the oscillatory wave drive units 6 (6A, 6B, 6C, and 6D) is fixed are between two limiting members 24 disposed in the direction (second direction) perpendicular to the driving direction 8 (first direction). In the oscillatory wave drive unit 6A, the side surfaces along the X direction of the sleeves 14 and the side surfaces along the X direction of the limiting members 24 form a guide in the X direction. This guide permits the movement of the vibrator 9 and the sleeves 14 relative to the moving body 5 in the driving direction 8 (X direction) and limits the amount of movement of the vibrator 9 and the sleeves 14 relative to the moving body 5 in the Y direction perpendicular to the driving direction 8 (X direction). In the other oscillatory wave drive units (6B, 6C, and 6D), as in the oscillatory wave drive unit 6A, the movement of the vibrator 9 and the sleeves 14 relative to the moving body 5 in the driving direction 8 is permitted, and the amount of movement of the vibrator 9 and the sleeves 14 relative to the moving body 5 in the direction perpendicular to the driving direction 8 is limited.

The advantageous effect of the limiting members 24 will be described. The driving direction of the oscillatory wave drive unit 6A is the X direction. Normally, the relative movement between the moving body 5 and the vibrator 9 in the Y direction does not occur. In this case, when a desired amount of movement is given to the moving body 5, the amount of movement of the vibrator 9 relative to the bars 15 is equal to the desired amount of movement of the moving body 5.

However, misalignment of the driving direction due to mounting errors or the like, or disturbance can cause relative movement between the moving body 5 and the vibrator 9 due to a slip in the Y direction. In this case, the amount of movement of the vibrator 9 and the sleeves 14 relative to the bars 15 in the Y direction is the sum of the desired amount of movement of the moving body 5 and the amount of relative movement between the moving body 5 and the vibrator 9 due to a slip.

If this relative movement due to a slip occurs repeatedly, the amount of relative movement between the moving body 5 and the vibrator 9 and the sleeves 14 in the Y direction may increase. If the amount of relative movement is too large, the end of the guide member composed of the sleeves 14 and the bars 15 is reached, and an unwanted force changing the attitude acts on the vibrator 9. This causes a problem such as unstable contact between the moving body 5 and the vibrator 9.

In this embodiment, the amount of relative movement between the vibrator 9 and the sleeves 14 and the moving body 5 in the Y direction is limited by the limiting members 24. Thus, the amount of movement of the vibrator 9 and the sleeve 14 relative to the bars 15 can be limited, and the above problem can be prevented.

In the other oscillatory wave drive units (6B, 6C, and 6D), the same advantageous effect can be obtained. In the oscillatory wave drive units 6 including a Y-deforming spring 18 or Y-deforming springs 18 described in the second to sixth embodiments, the limiting members 24 are also effective.

A description will be given of a case where the side surfaces of the limiting members 24 and the side surfaces of the holder 20 to which the vibrator 9 is fixed form a guide in the direction perpendicular to the driving direction. When a desired amount of movement is given to the moving body 5, a displacement occurs in the Y-deforming spring 18 or Y-deforming springs 18. The amount of the displacement is the sum of this amount of movement and the amount of relative movement between the moving body 5 and the vibrator 9 due to a slip in the Y direction. When the amount of relative movement due to a slip is large, the deformation reaction force of the Y-deforming spring 18 or Y-deforming springs 18 is large, and the force preventing the moving body 5 from moving in the Y direction is large. If the Y-deforming spring 18 or Y-deforming springs 18 are subjected to plastic deformation, the force preventing the moving body 5 from moving in the Y direction is further increased by work hardening.

When the amount of movement of the vibrator 9 relative to the moving body 5 in the Y direction is limited by limiting members 24 as in this embodiment, the deformation of the Y-deforming spring 18 or Y-deforming springs 18 can be reduced. In this embodiment, examples of mechanisms limiting the amount of movement of the vibrator 9 relative to the moving body 5 in the direction perpendicular to the driving direction include not only a configuration composed of limiting members 24 and sleeves 14, and a configuration composed of limiting members 24 and a holder 20 described above but also other configurations such as a configuration composed of bars and sleeves. The moving body 5 may be provided with grooves along the driving directions of the oscillatory wave drive units 6, and each groove and the side surfaces of the protrusions 12 of the corresponding vibrator 9 may form a slide guide. The configuration of the limiting mechanism is not limited as long as it can limit the amount of movement of the vibrator 9 relative to the moving body 5 in the direction perpendicular to the driving direction.

Eighth Embodiment

In the first to seventh embodiments, guide members or leaf springs are used.

Figure 10A:
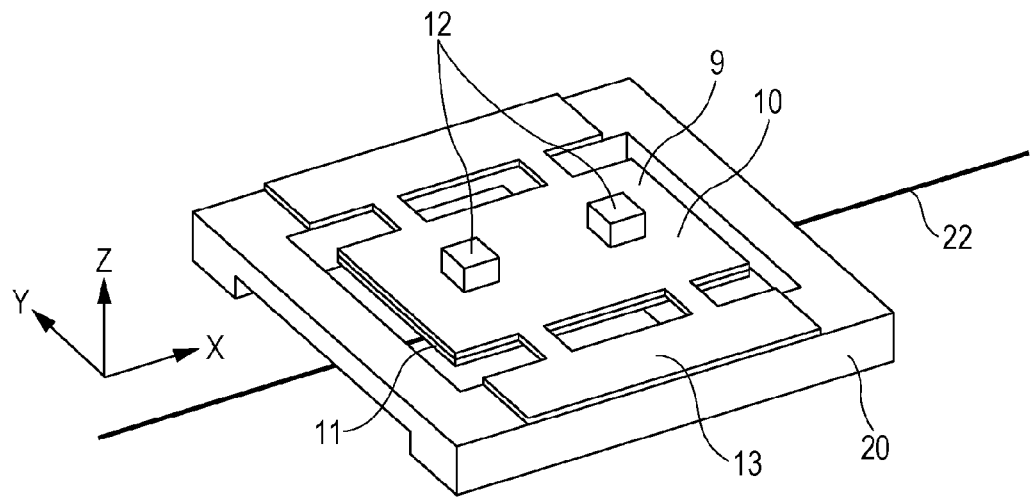
FIG. 10A is a perspective view of an oscillatory wave drive unit according to an eighth embodiment.
Figure 10B:
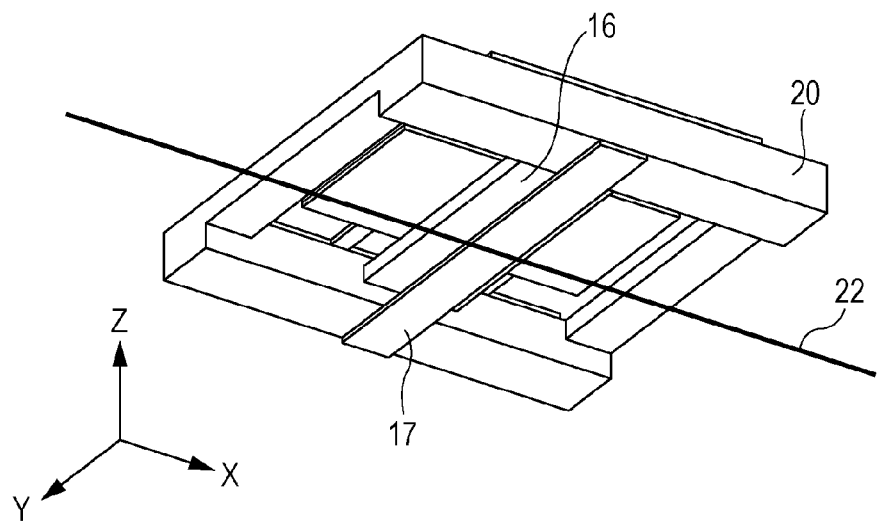
FIG. 10B is another perspective view of the oscillatory wave drive unit according to the eighth embodiment.

However, there are other embodiments from which the advantageous effects of the present invention can be obtained. For example, as shown in FIGS. 10A and 10B, a small-diameter thin round bar 22 can be disposed on the spring 17 and in the driving direction of the oscillatory wave drive unit, or in the X direction in the figures, and both ends of the round bar 22 can be secured to a lens barrel 1 (not shown). The coordinate system in the figures is a right-handed rectangular coordinate system.

In this configuration, the vibrator 9 is prone to rotary motion about the round bar 22. When the moving body 5 is moved by another actuator in the Y direction (second direction), so as not to prevent the movement of the moving body 5, the vibrator 9 rotates such that the upper surfaces of the protrusions 12 move in the Y direction.

Figure 11A:
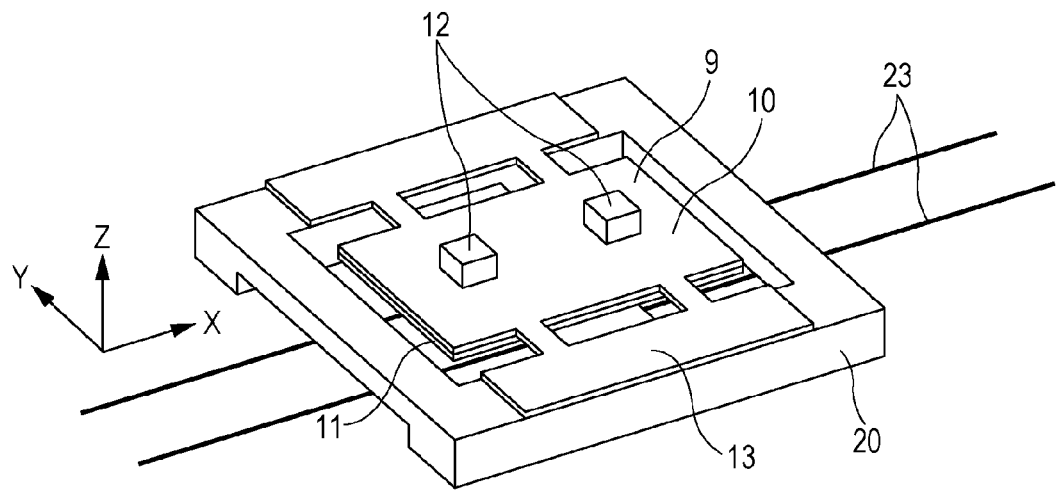
FIG. 11A is a perspective view of another oscillatory wave drive unit according to the eighth embodiment.
Figure 11B:
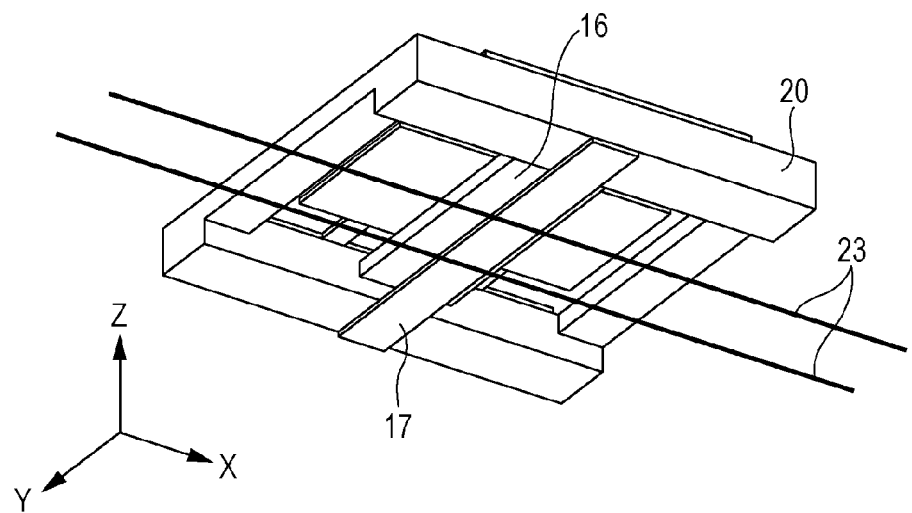
FIG. 11B is another perspective view of the other oscillatory wave drive unit according to the eighth embodiment.

As another example, as shown in FIGS. 11A and 11B, two wires 23 can be disposed on the spring 17 and in the X direction in the figures, and both ends of the wires 23 can be secured to a lens barrel 1 (not shown). The coordinate system in the figures is a right-handed rectangular coordinate system. In this configuration, by regulating the tension applied to the two wires 23, the stiffness to the movement of the vibrator 9 in the Y direction (second direction) can be easily regulated.

Also in these examples, the vibrator 9 moves in the Y direction easily. Therefore, when the moving body 5 is moved by another actuator in the Y direction, the vibrator 9 does not prevent the movement of the moving body 5.

In order to obtain the advantageous effects of the present invention, the protrusions 12 of the vibrator 9 in contact with the moving body 5 do not necessarily have to have a protruding shape. The upper surfaces thereof do not necessarily have to be in contact with the moving body 5. For example, the tips of the protrusions 12 may be chamfered, and the chamfer may be in contact with the moving body 5. The tips of the protrusions 12 may be rounded.

The Y-deforming spring or Y-deforming springs deform mainly in the Y direction perpendicular to the X direction in each figure. This is for illustrative purpose. When the Y-deforming spring or Y-deforming springs mainly deform in a direction intersecting with the X direction, the advantageous effect of the present invention can be obtained as long as there is a component moving in the Y direction when the Y-deforming spring or Y-deforming springs deform.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-186068, filed Aug. 23, 2010, which is hereby incorporated by reference herein in its entirety.

The invention claimed is:

1. An oscillatory wave drive unit comprising:
    a first vibrator having an electromechanical energy converting element;
    a second vibrator having an electromechanical energy converting element;
    a first supporting member configured to support the first vibrator; and
    a second supporting member configured to support the second vibrator,
    wherein the oscillatory wave drive unit excites oscillation in the first vibrator and the second vibrator and moves a moving body by frictional force,
    wherein the first supporting member comprises a first moving mechanism configured to support the first vibrator movably in a second direction intersecting with a first direction in which the first vibrator drives the moving body,
    wherein the first direction and the second direction are in a plane parallel to a plane where the first vibrator and the moving body are in contact with each other,
    wherein the second supporting member comprises a second moving mechanism configured to support the second vibrator movably in a fourth direction intersecting with a third direction in which the second vibrator drives the moving body, and
    wherein the third direction and the fourth direction are in a plane parallel to a plane where the second vibrator and the moving body are in contact with each other,
    wherein the second direction is not perpendicular to the third direction, and
    wherein the fourth direction is not perpendicular to the first direction.

2. The oscillatory wave drive unit according to claim 1, wherein the first moving mechanism includes a guide member configured to limit a moving direction of the first vibrator.

3. The oscillatory wave drive unit according to claim 1, wherein the first moving mechanism includes an elastic member.

4. The oscillatory wave drive unit according to claim 3, wherein a spring stiffness of the elastic member in the second direction is lower than a spring stiffness of the elastic member in the first direction of the first vibrator.

5. The oscillatory wave drive unit according to claim 3, wherein the elastic member includes at least one plate portion.

6. The oscillatory wave drive unit according to claim 5, wherein the thickness direction of the at least one plate portion is the second direction.

7. The oscillatory wave drive unit according to claim 6, wherein the at least one plate portion comprises a plurality of plate portions arranged in the first direction.

8. The oscillatory wave drive unit according to claim 6, wherein the at least one plate portion comprises a plurality of plate portions arranged in the second direction.

9. The oscillatory wave drive unit according to claim 1, wherein the oscillatory wave drive unit moves the moving body in contact with the first vibrator and the second vibrator.

10. The oscillatory wave drive unit according claim 1, wherein the first direction and the third direction are different from each other.

11. The oscillatory wave drive unit according to claim 10, wherein the first direction and the third direction are perpendicular to each other.

12. The oscillatory wave drive unit according to claim 1, further comprising a limiting mechanism configured to limit an amount of relative movement between the first vibrator and the moving body in the second direction.

13. The oscillatory wave drive unit according to claim 9, wherein the first vibrator and the second vibrator are provided at a same side of the moving body.

14. The oscillatory wave drive unit according to claim 9, wherein the first vibrator and the second vibrator are in contact with a same surface of the moving body.

15. The oscillatory wave drive unit according to claim 1, wherein the first vibrator has a projection, and wherein a surface of the projection moves along elliptic loci.

16. An image stabilization device comprising:
    the oscillatory wave drive unit according to claim 1;
    an optical lens or an image sensor;
    a control unit; and
    a power source.

17. The oscillatory wave drive unit according to claim 1, wherein the second direction is parallel to the third direction, and wherein the fourth direction is parallel to the first direction.

18. An oscillatory wave drive unit comprising:
    a first vibrator having an electromechanical energy converting element;
    a second vibrator having an electromechanical energy converting element;
    a first supporting member configured to support the first vibrator; and
    a second supporting member configured to support the second vibrator,
    wherein the oscillatory wave drive unit excites oscillation in the first vibrator and the second vibrator and moves a moving body in contact with the first vibrator and the second vibrator by frictional force,
    wherein the first supporting member comprises a first moving mechanism configured to support the first vibrator movably in a second direction intersecting with a first direction in which the first vibrator drives the moving body, and
    wherein the first direction and the second direction are in a plane parallel to a plane where the first vibrator and the moving body are in contact with each other,
    wherein the first vibrator and the second vibrator are provided at a same side of the moving body.

19. The oscillatory wave drive unit according to claim 18, wherein the first vibrator and the second vibrator are in contact with a same surface of the moving body.

\* \* \* \* \*